(12) United States Patent
Liu et al.

(10) Patent No.: US 11,137,510 B2
(45) Date of Patent: Oct. 5, 2021

(54) SEISMIC RESERVOIR MONITORING USING COMMON TRANSMISSION POINTS

(71) Applicant: Saudi Arabian Oil Company, Dhahran (SA)

(72) Inventors: Hongwei Liu, Dhahran (SA); Yi Luo, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 241 days.

(21) Appl. No.: 16/391,691

(22) Filed: Apr. 23, 2019

(65) Prior Publication Data

US 2020/0341161 A1 Oct. 29, 2020

(51) Int. Cl.
*G01V 1/30* (2006.01)

(52) U.S. Cl.
CPC ...... *G01V 1/308* (2013.01); *G01V 2210/6122* (2013.01)

(58) Field of Classification Search
CPC .............. G01V 1/308; G01V 2210/61; G01V 2210/612; G01V 2210/6122
See application file for complete search history.

(56) References Cited

U.S. PATENT DOCUMENTS

| 2,652,562 A * | 9/1953 | Hawkins | ................. G01S 1/304 342/396 |
|---|---|---|---|
| 3,731,270 A | 5/1973 | Penhollow | |
| 10,107,927 B2 | 10/2018 | Alkhatib | |
| 10,145,971 B2 * | 12/2018 | Bertrand | ................. G01V 1/22 |

| 2014/0172307 A1 | 6/2014 | Svay et al. |
| 2014/0192307 A1 | 6/2014 | Svay et al. |
| 2014/0200815 A1 | 7/2014 | Hung et al. |
| 2016/0209533 A1 | 7/2016 | Haacke et al. |
| 2018/0267187 A1 | 9/2018 | Al-Ali et al. |

FOREIGN PATENT DOCUMENTS

GB 2433780 7/2007

OTHER PUBLICATIONS

Cary, "A strategy for layer-stripping 3D converted wave data," SEG Technical Program Expanded Abstracts, Jan. 1995, 4 pages.
PCT International Search Report and Written Opinion in International Appln. No. PCT/US2020/029315, dated Jul. 31, 2020, 18 pages.
Liu and Al-Ali, "Common-focus point-based target-oriented imaging approach for continuous seismic reservoir monitoring," Geophysics, vol. 83, No. 4, Jul.-Aug. 2018, 8 pages.
Zhang, "Timer core differential motions confirmed by earthquake waveform doublets," Science 309, 2005, 6 pages.

* cited by examiner

*Primary Examiner* — Elias Desta
(74) *Attorney, Agent, or Firm* — Fish & Richardson P.C.

(57) ABSTRACT

Common transmission points can be used to monitor a seismic reservoir. First and second common transmission points (CTPs) are received. For each of the first CTP gather and the second CTP gather, the traces before the CTP can be aggregated, and the traces crossing the CTP can be aggregates. The aggregated before CTP traces from the first CTP gather can be compared with the aggregated before CTP traces from the second CTP gather to determine a first time difference. The aggregated cross CTP traces from the first CTP gather can be compared with the aggregated cross CTP traces from the second CTP gather to determine a second time difference. A third time difference can be determined based at least partially on the first time difference and the second time difference.

18 Claims, 9 Drawing Sheets

SEISMIC RESERVOIR MONITORING USING COMMON TRANSMISSION POINTS

TECHNICAL FIELD

The present disclosure generally relates to monitoring reservoirs in underground formations using successive seismic surveys and common transmission points.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys.

One approach to this analysis is based on tracing and correlating along continuous reflectors throughout the dataset produced by the seismic survey to produce structural maps (images) that reflect the spatial variation in depth of certain facies. These maps can be used to identify impermeable layers and faults that can trap hydrocarbons, such as oil and gas. In some instances, tracing can involve the process of migration (for example, imaging), which involves the repositioning of seismic data so that a more accurate picture of subsurface reflectors is given. Performing migration calculations can include determining/approximating the seismic velocities in the subsurface at a multitude of points.

Furthermore, four-dimensional (4D) seismic interpretation methods typically involve comparing the differences in maps/images or other seismic processing products generated from seismic data acquired at different times. For example, an initial seismic survey of a target region (for example, a reservoir), often referred to as a baseline survey, can be recorded prior to any hydrocarbon production or injection within the target region. Then, a subsequent monitor survey may be recorded after a period of years has passed during which hydrocarbons were produced in the target region. The subsurface seismic reflectivity can change between these two seismic surveys. These differences are typically interpreted to be caused by changes in fluid content and pressure in the hydrocarbon reservoir. These differences can be used to estimate which parts of the reservoir have been producing hydrocarbons and which parts of the reservoir might produce hydrocarbon more efficiently by a change in well pattern or fluid injection methods.

SUMMARY

This specification describes systems and methods for monitoring reservoirs in underground formations in which a target oriented approach is used to track four-dimensional seismic signals from prestack seismic data for continuous reservoir monitoring using successive seismic surveys. As used in this specification, a four-dimensional seismic signal refers to the magnitude of a change in acoustic response of a reservoir between two seismic surveys taken over the same region at different times. A baseline survey and a subsequent monitor survey are conducted to generate raw seismic data at different times. Common transmission point (CTP) gathers are generated for both the baseline and monitor survey. The time shift between the CTP gathers of the baseline and monitor surveys are scanned at points before the CTP. The time shift between the CTP gathers of the baseline and monitor surveys are also scanned at points at or after the CTP ("crossing the CTP"). The differences between the time shifts before the CTP and after the CTP are calculated to generate a four dimensional signal.

In at least one aspect of the present disclosure, a computer-implemented method for monitoring a reservoir in an underground formation by generating a four dimensional seismic signal based on multiple sets of seismic data representing a subterranean formation is provided. The method includes receiving a first common transmission point (CTP) gather and a second CTP gather. The first and second CTP gathers correspond to at least one CTP. The first CTP gather including a first at least one plurality of before CTP traces and a first at least one plurality of cross CTP traces. The second CTP gather includes a second at least one plurality of before CTP traces and a second at least one plurality of cross CTP traces. The method includes, for the first CTP gather, aggregating the first at least one plurality of before CTP traces to generate a first at least one aggregate before CTP trace and aggregating the first at least one plurality of cross CTP traces to generate a first at least one aggregate cross CTP trace. The method includes, for the second CTP gather, aggregating the second at least one plurality of before CTP traces to generate a second at least one aggregate before CTP trace and aggregating the second at least one plurality of cross CTP traces to generate a second at least one aggregate cross CTP trace. The method includes determining a first time difference between the first at least one aggregate before CTP trace and the second at least one aggregate before CTP trace. The method includes determining a second time difference between the first at least one aggregate cross CTP trace and the second at least one aggregate cross CTP trace. The method includes determining a third time difference based on the first time difference and the second time difference.

The first CTP gather can correspond to a baseline seismic survey conducted at a first time. The second CTP gather can correspond to a monitor seismic survey conducted at a second time, the second time occurring after the first time.

The method can further include generating the first CTP gather from a first set of raw seismic data and generating the second CTP gather from a second set of raw seismic data. The second set of raw seismic data can represent conditions in the underground formation between one and three years after the first set of raw seismic data was generated. The method can further include determining an amount of change of hydrocarbon fluid levels in the reservoir between a baseline survey and a monitor survey based at least partially on the third time difference.

In at least one other aspect of the present disclosure, a system is provided. The system includes a computer-readable memory. The computer-readable memory includes computer-executable instructions. The system includes at least one processor configured to execute the computer-executable instructions. When the at least one processor executes the computer-executable instructions, the at least one processor is caused to perform operations to receive a first common transmission point (CTP) gather and a second CTP gather. The first and second CTP gathers correspond to at least one CTP. The first CTP gather includes a first at least one plurality of before CTP traces and a first at least one plurality of cross CTP traces. The second CTP gather includes a second at least one plurality of before CTP traces and a second at least one plurality of cross CTP traces. When the at least one processor executes the computer-executable instructions, the at least one processor is caused to perform operations to, for the first CTP gather, aggregate the first at least one plurality of before CTP traces to generate a first at least one aggregate before CTP trace and aggregate the first at least one plurality of cross CTP traces to generate a first at least one aggregate cross CTP trace. When the at least one processor executes the computer-executable instructions, the at least one processor is caused to perform operations to, for the second CTP gather, aggregate the second at least one plurality of before CTP traces to generate a second at least one aggregate before CTP trace and aggregate the second at least one plurality of cross CTP traces to generate a second at least one aggregate cross CTP trace. When the at least one processor executes the computer-executable instructions, the at least one processor is caused to perform operations to determine a first time difference between the first at least one aggregate before CTP trace and the second at least one aggregate before CTP trace. When the at least one processor executes the computer-executable instructions, the at least one processor is caused to perform operations to determine a second time difference between the first at least one aggregate cross CTP trace and the second at least one aggregate cross CTP trace. When the at least one processor executes the computer-executable instructions, the at least one processor is caused to perform operations to determine a third time difference based on the first time difference and the second time difference.

The first CTP gather can correspond to a baseline seismic survey conducted at a first time. The second CTP gather can correspond to a monitor seismic survey conducted at a second time, the second time occurring after the first time.

When the at least one processor executes the computer-executable instructions the at least one processor can further be caused to perform operations to generate the first CTP gather from a first set of raw seismic data and generate the second CTP gather from a second set of raw seismic data. The second set of raw seismic data can represent conditions in the underground formation between one and three years after the first set of raw seismic data was generated.

When the at least one processor executes the computer-executable instructions the at least one processor can be further caused to perform operations to determine an amount of change of hydrocarbon fluid levels in the reservoir between a baseline survey and a monitor survey based at least partially on the third time difference.

Embodiments of these systems and methods can include one or more of the following advantages. By using the described systems and methods, the amount of data collected and processed for seismic surveys is accomplished in a cost effective manner through the use of common transmission point gathers. In contrast, conventional methods of continuous reservoir monitoring typically use common middle point (CMP) gathers for the monitoring surveys and the baseline surveys. These conventional approaches are typically more expensive and less efficient than the described systems and methods with respect to data acquisition and computational cost because CMP gathers generally carry less information about seismic responses than CTP gathers, and more data acquisition and processing is needed when using CMP gathers. For example, because CTP gathers include both reflection data from the reflection point, and also data from the transmission point, the CTP gathers include more information than CMP gathers that typically only include reflection data from the reflection point. Additionally, unlike the conventional approaches that use CMP gathers, the CTP gathers are target oriented and therefore the resulting calculations are not affected by response changes due to rock overburden pressures.

The systems and methods described in this specification use CTP gathers to monitor a reservoir. The systems and methods exploit the fact that CTP gathers are target oriented and typically carry more information than the more conventional CMP gathers. Consequently, when compared to conventional methods, the number of surveys that can be conducted within a period of time is increased, fluid acceleration within a target region can be calculated due to the increase in conducted surveys, and the computational cost of processing successive surveys is significantly reduced because the need to process entire data sets from surface to reservoir can be reduced. The described approach also enables cost effective deployment of permanent sources and receivers in a particular region, facilitating cost effective and fully automated reservoir monitoring using seismic data.

The details of one or more embodiments of these systems and methods are set forth in the accompanying drawings and the following description. Other features, objects, and advantages of these systems and methods will be apparent from the description and drawings, and from the claims.

BRIEF DESCRIPTION OF DRAWINGS

Like reference symbols in the various drawings indicate like elements.

DETAILED DESCRIPTION

This specification describes systems and methods in which a target oriented approach is used to track four-dimensional seismic signals from prestack seismic data for continuous reservoir monitoring using successive seismic surveys. In this specification, a four-dimensional seismic signal refers to the magnitude of a change in acoustic response of a reservoir between two seismic surveys taken over the same region at different times. A baseline survey and a subsequent monitor survey is conducted to generate raw seismic data at different times. CTP gathers are generated for both the baseline and monitor survey. The time shift between the CTP gathers of the baseline and monitor surveys are scanned at points before the CTP. The time shift between the CTP gathers of the baseline and monitor surveys are also scanned at points crossing the CTP. The differences between the time shifts before the CTP and after the CTP are calculated to generate a four dimensional signal.

Figure 1:
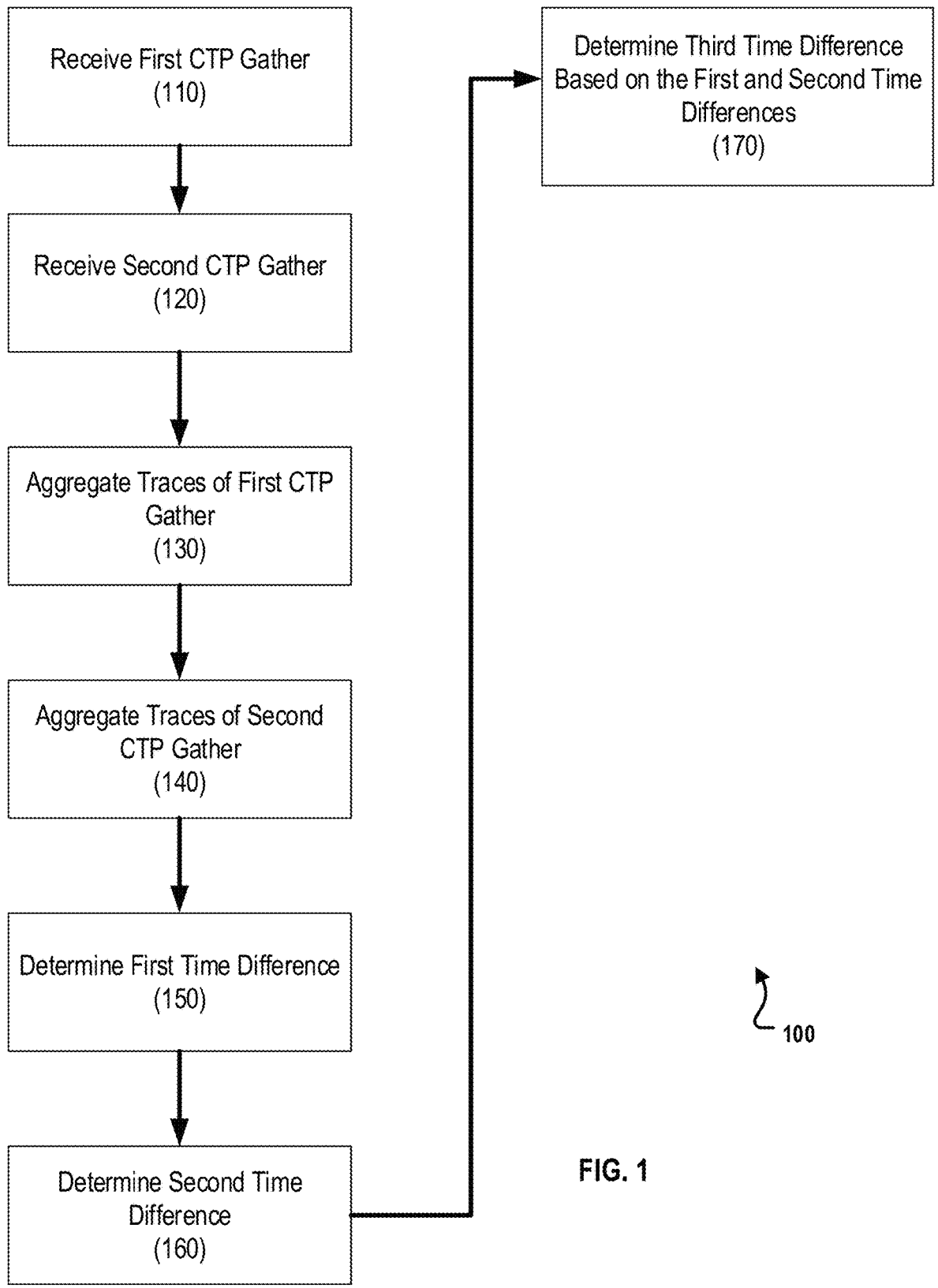
FIG. 1 is a flow diagram illustrating a method of reservoir monitoring using common transmission points.

FIG. 1 is a flow diagram illustrating a method 100 of reservoir monitoring. The method includes receiving a first CTP gather (block 110), receiving a second CTP gather (block 120), aggregating the traces of the first CTP gather (block 130), aggregating the traces of the second CTP gather (block 140), determining a first time difference (block 150), determining a second time difference (block 160), and determining a third time difference based on the first and second time differences (block 170).

Figure 2:
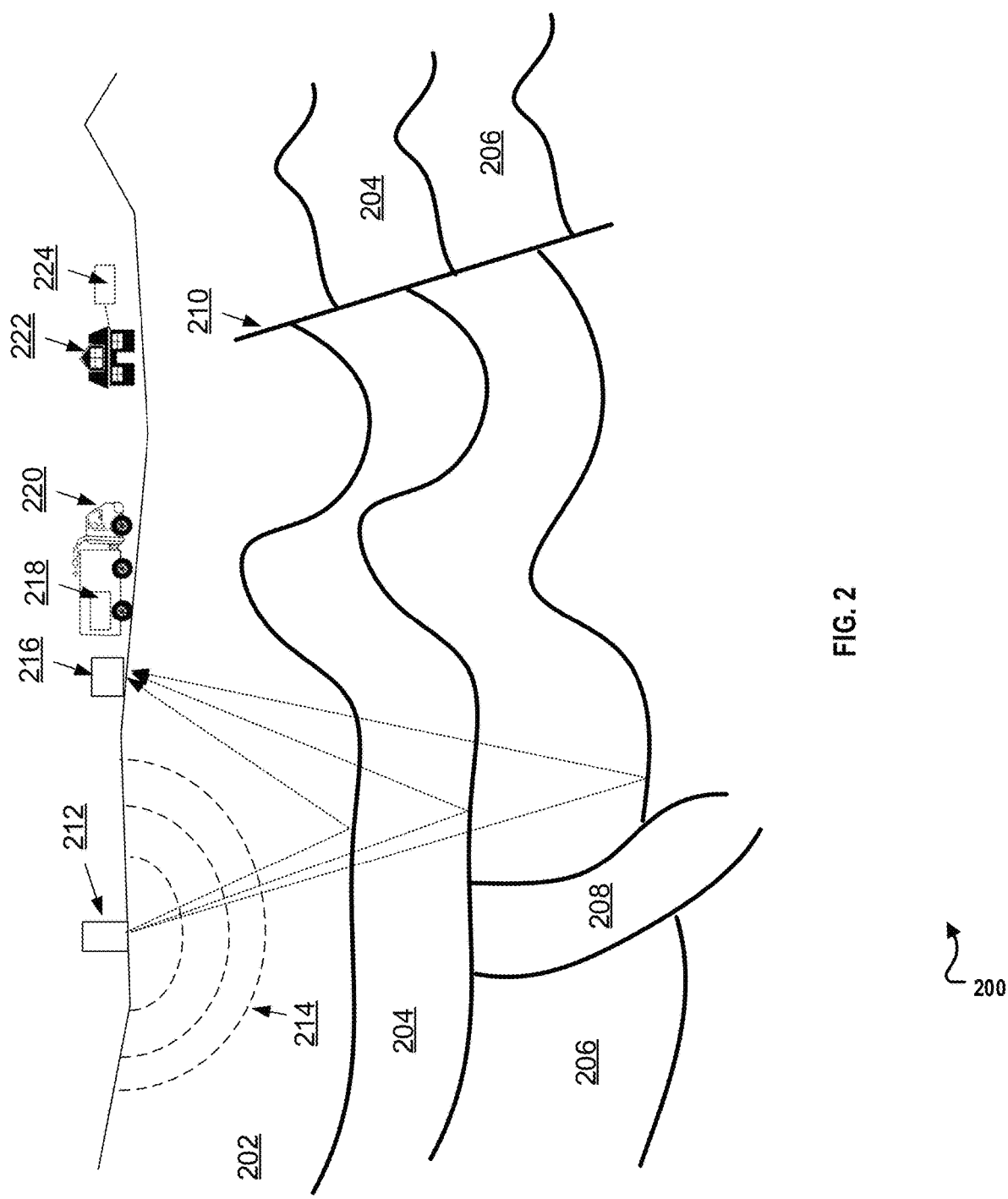
FIG. 2 is a schematic view of a seismic survey being performed to map subterranean features such as facies and faults.

At block 110, a first CTP gather is received. The first CTP gather is associated with raw seismic data gathered from a baseline seismic survey. For example, FIG. 2 is a schematic view of a seismic survey being performed to map subterranean features of a target region, such as a hydrocarbon reservoir. The subterranean formation 200 includes a layer of impermeable cap rocks 202 at the surface. Facies underlying the impermeable cap rocks 202 include a sandstone layer 204, a limestone layer 206, and a sand layer 208. A fault line 210 extends across the sandstone layer 204 and the limestone layer 206.

A seismic source 212 (for example, a seismic vibrator or an explosion) generates seismic waves 214 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 200, the velocity of seismic waves traveling through the subterranean formation 200 will be different in the sandstone layer 204, the limestone layer 206, and the sand layer 208. As the seismic waves 214 contact interfaces between geologic bodies or layers that have different velocities, the interface reflects some of the energy of the seismic wave and refracts some of the energy of the seismic wave. Such interfaces are sometimes referred to as horizons.

The seismic waves 214 are received by a sensor or sensors 216. Although illustrated as a single component, the sensor or sensors 216 are typically a line or an array of sensors 216 that generate an output signal in response to received seismic waves including waves reflected by the horizons in the subterranean formation 200. The sensors 216 can be geophone-receivers that produce electrical output signals transmitted as input data, for example, to a computer 218 on a seismic control truck 220. Based on the input data, the computer 218 may generate a seismic data output such as, for example, a seismic two-way response time plot.

A control center 222 can be operatively coupled to the seismic control truck 220 and other data acquisition and wellsite systems. The control center 222 may have computer facilities for at least one of receiving, storing, processing, or analyzing data from the seismic control truck 220 and other data acquisition and wellsite systems. For example, computer systems 224 in the control center 222 can be configured to analyze, model, control, optimize, or perform management tasks of field operations associated with development and production of resources such as oil and gas from the subterranean formation 200. Alternatively, the computer systems 224 can be located in a different location than the control center 222. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 224 may be displayed for user viewing using local or remote monitors or other display units. One approach to analyzing seismic data is to associate the data with portions of a seismic cube representing the subterranean formation 200. The seismic cube can display results of the analysis of the seismic data associated with the seismic survey.

A CTP gather includes a plurality of traces caused by reflections of acoustic waves transmitting towards (and through) a CTP.

Figure 3A:
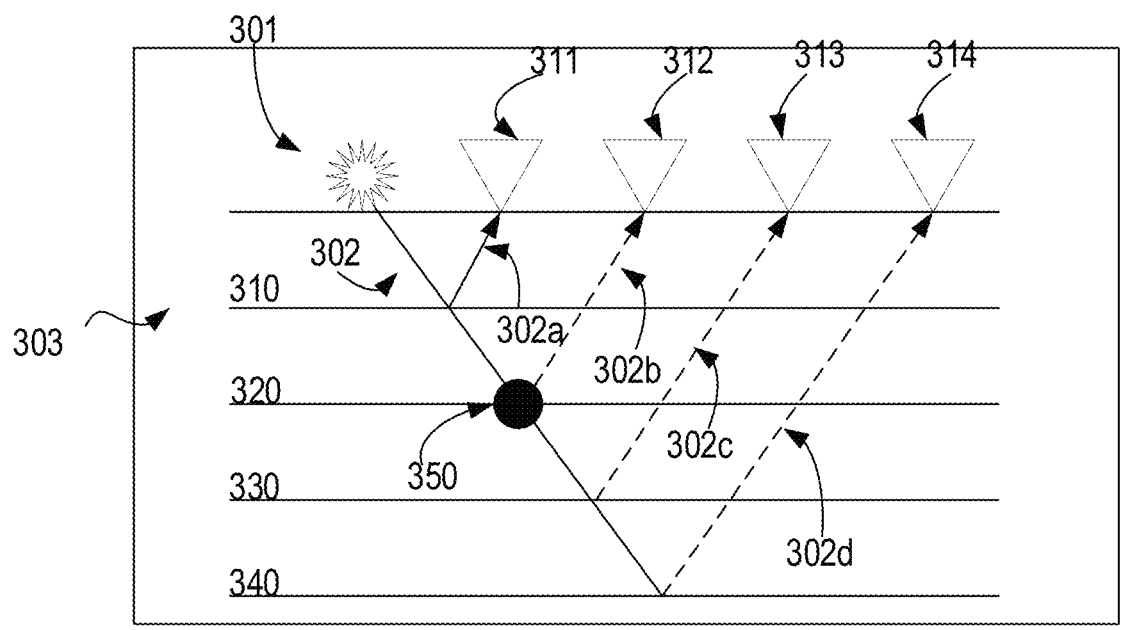
FIGS. 3A-3C are illustrations showing the CTP gather concept.
Figure 3B:
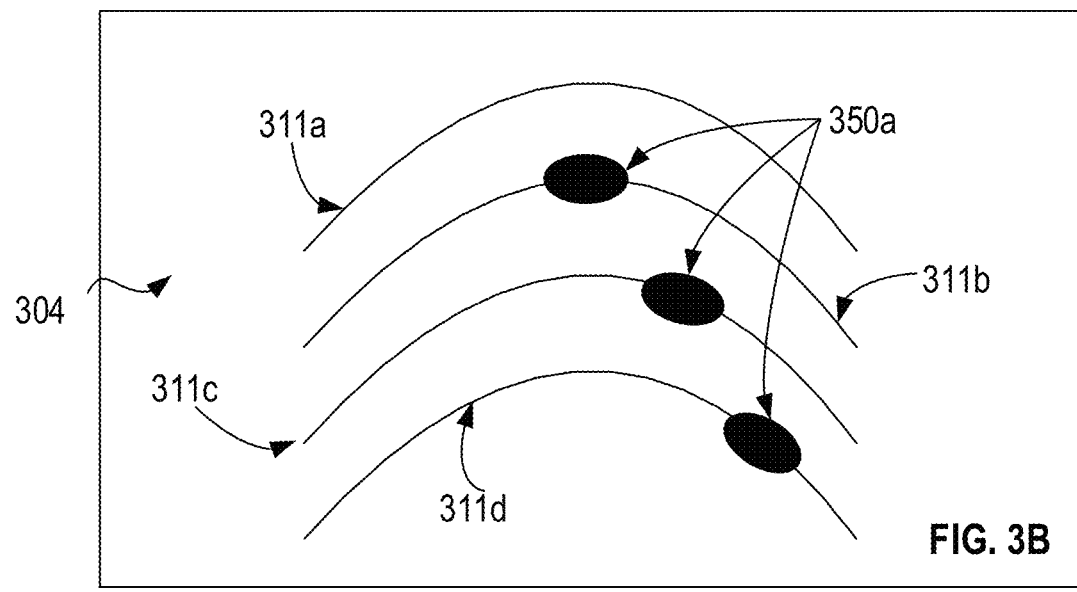
Figure 3C:
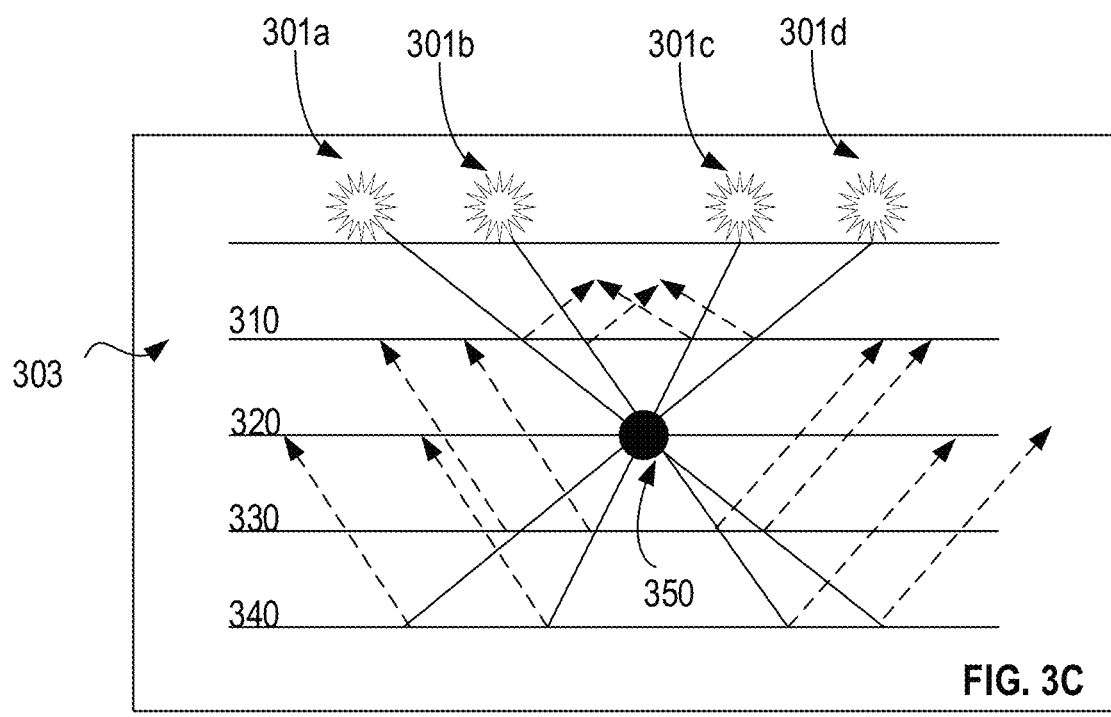

For example, FIGS. 3A-3C are illustrations showing the CTP gather concept. Referring to FIG. 3A, a source 301 emits an acoustic wave 302 through a subterranean formation 303 towards a CTP 350. The subterranean formation 303 includes a first subterranean layer 310, a second subterranean layer 320, a third subterranean layer 330, and a fourth subterranean layer 340. As the acoustic wave 302 propagates through the subterranean formation 303, a first portion 302a of the wave 302 is reflected off the first subterranean layer 310 and towards a first receiver 311, a second portion 302b of the wave 302 is reflected off the second subterranean layer 320 and towards a second receiver 312, a third portion 302c of the wave 302 is reflected off the third subterranean layer 330 and towards a third receiver 313, and a fourth portion 302d of the wave 302 is reflected off the fourth subterranean layer 340 and towards the fourth receiver 314.

Referring to FIG. 3B, a CTP gather 304 is shown. The CTP gather 304 includes a first trace 311a, a second trace 312b, a third trace 313c, and a fourth trace 313d. Each of the receivers 311, 312, 313, 314 generate a trace based on the received portion of the acoustic wave. For example, the first trace 311a is associated with the first receiver 311 and therefore is a recording of the first portion 302a of the wave 302 as it reflected off the first subterranean layer 310, the second trace 311b is associated with the second receiver 312 and therefore is a recording of the second portion 302b of the wave 302 as it reflected off the second subterranean layer 320, and so forth. Because the first trace 311a corresponds to the first portion 302a of the wave 302, which reflected before the wave 302 crossed the CTP 350, the first trace 311a does not contain information about the CTP. A trace corresponding to a portion of a wave that reflected before the wave crossed the CTP is described in this specification as a "before CTP trace." The second trace 311b, third trace 311c, and fourth trace 311d all correspond to portions of the wave 302 that reflected after the wave 302 crossed the CTP 350, and therefore contain information 350a about the CTP 350. A trace corresponding to a portion of a wave that reflected after the wave crossed the CTP is described in this specification as a "cross CTP trace." Although, for illustrative purposes, only one source is shown in FIGS. 3A-3B, typically multiple sources will be used to generate the seismic data.

For example, FIG. 3C shows acoustic waves from multiple sources 301a, 301b, 301c, 301d transmitting through a CTP 350, the CTP 350 being common to the multiple sources 301a, 301b, 301c, 301d.

Referring back to FIG. 1, additionally or alternatively, the first CTP gather is received from existing seismic data. In some implementations, the first CPT gather is received by one or more computer processors communicatively coupled to a database having seismic data stored thereon.

At block 120 a second CTP gather is received. The second CTP gather corresponds to a monitor survey conducted at a time after the baseline survey was conducted. The second CTP gather can be received through similar means as the first CTP gather.

At block 130, the traces of the first CTP gather corresponding to the reflections of the acoustic waves before the CTP are merged into one trace to generate a first aggregate before CTP trace. Furthermore, the traces of the first CTP corresponding to the reflections of acoustic waves that have crossed the CTP are merged into one trace to generate a first aggregate cross CTP trace. Merging traces includes appending one trace to the end of a successive trace. For example, a second trace can be appended to the end of a first trace, a third trace can be appended to the end of a second trace, and so forth, until all traces are merged to one single trace.

At block 140, the traces of the second CTP gather corresponding to the reflections of the acoustic waves before the CTP are merged into one trace to generate a second aggregate before CTP trace. Furthermore, the traces of the second CTP corresponding to the reflections of acoustic waves that have crossed the CTP are merged into one trace to generate a second aggregate cross CTP trace.

At block 150, the first and second aggregate before CTP traces are compared to determine a first time difference between the aggregate before CTP traces. Comparing a first and second aggregate trace includes cross-correlating between the two traces.

Figure 4:
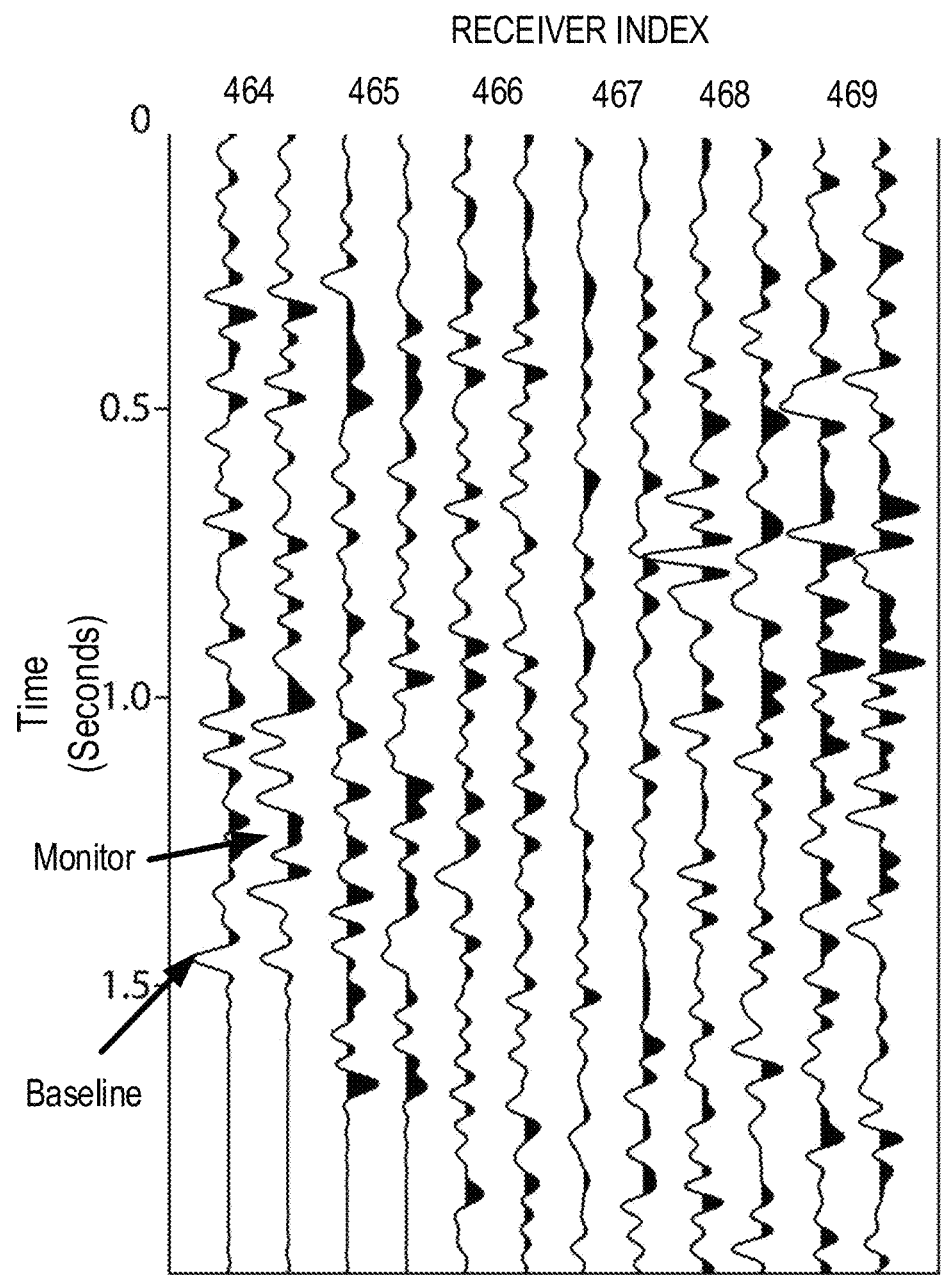
FIG. 4 shows the aggregate CTP traces for one CTP.

For example, FIG. 4 shows the aggregate CTP traces for one CTP. For illustrative purposes, the aggregate CTP traces shown in FIG. 4 include the before CTP traces corresponding to the baseline survey and the before CTP traces corresponding to the monitor survey. As shown, the baseline before CTP traces are similar to the monitor before CTP traces, but the monitor before CTP traces have shifted slight time-wise from the baseline before CTP traces. This time shift is estimated by the comparison to determine the first time difference.

Figure 5A:
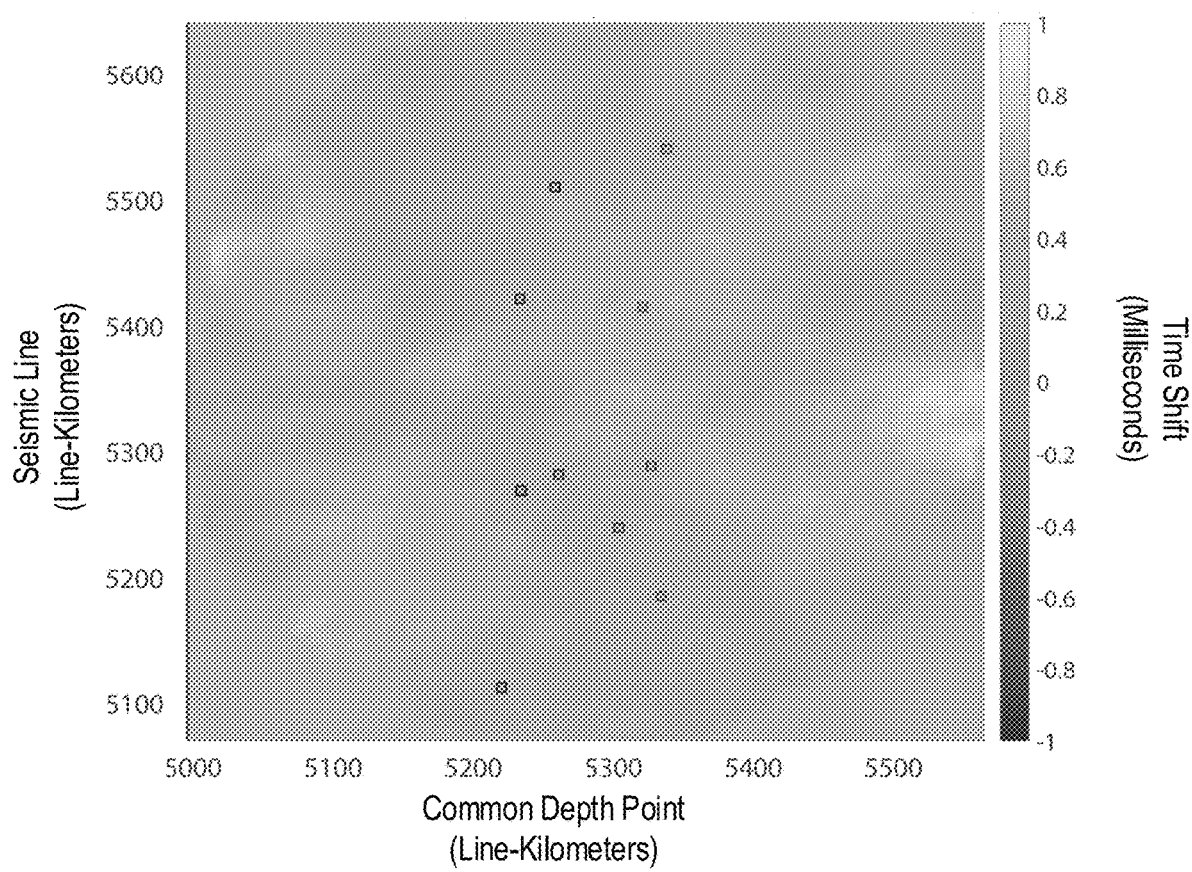
FIG. 5A shows a time shift image generated from a before CTP time shift scan.

FIG. 5A shows a time shift image generated from a before CTP time shift scan.

Referring back to FIG. 1, at block 160, the first and second aggregate cross CTP traces are compared to determine a second time difference in a similar manner as previously explained with reference to block 150.

Figure 5B:
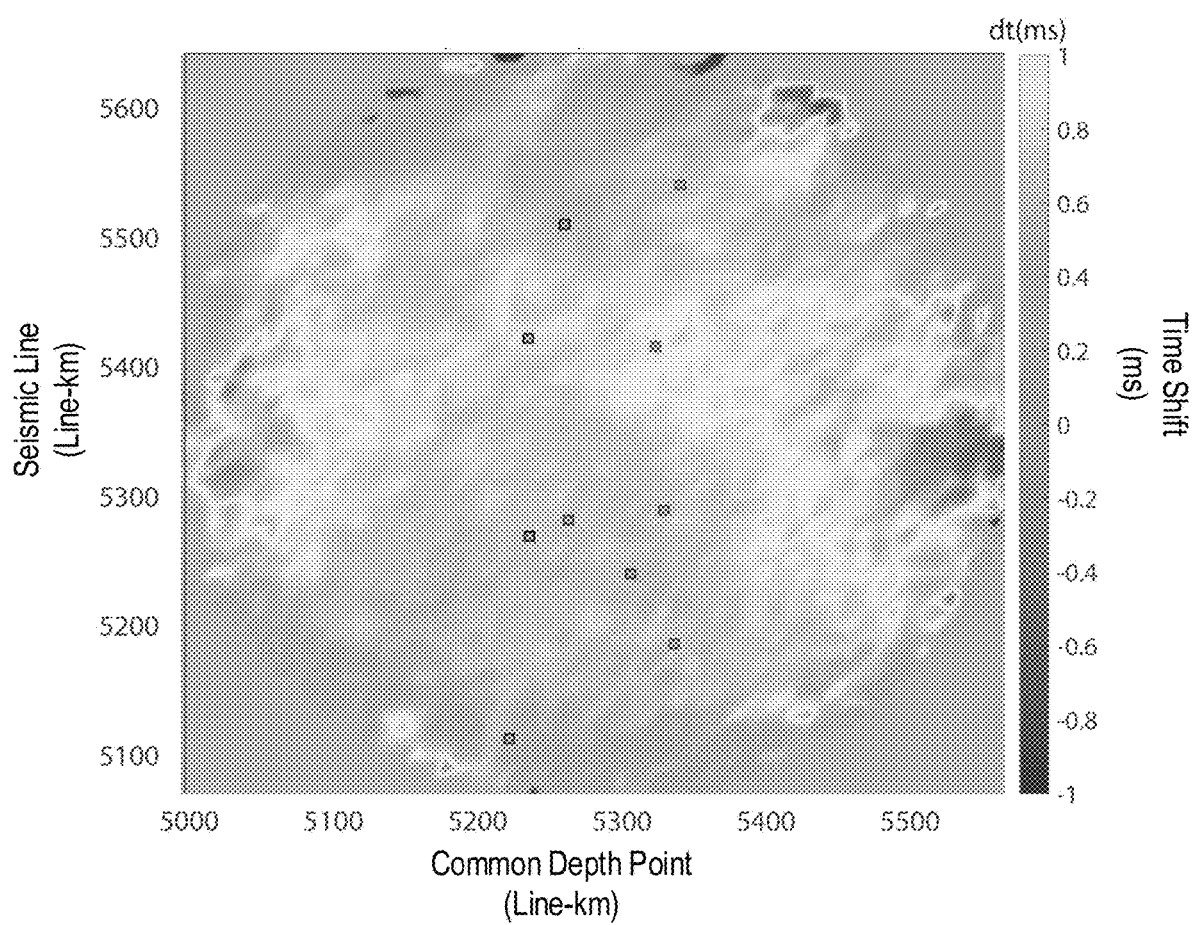
FIG. 5B shows a time shift image generated from a cross CTP time shift scan.

FIG. 5B shows a time shift image generated from a cross CTP time shift scan.

At block 170, the first time difference and the second time difference are subtracted to generate a third time difference. The third time difference gives the four-dimensional seismic signal between the baseline and monitor surveys.

Figure 5C:
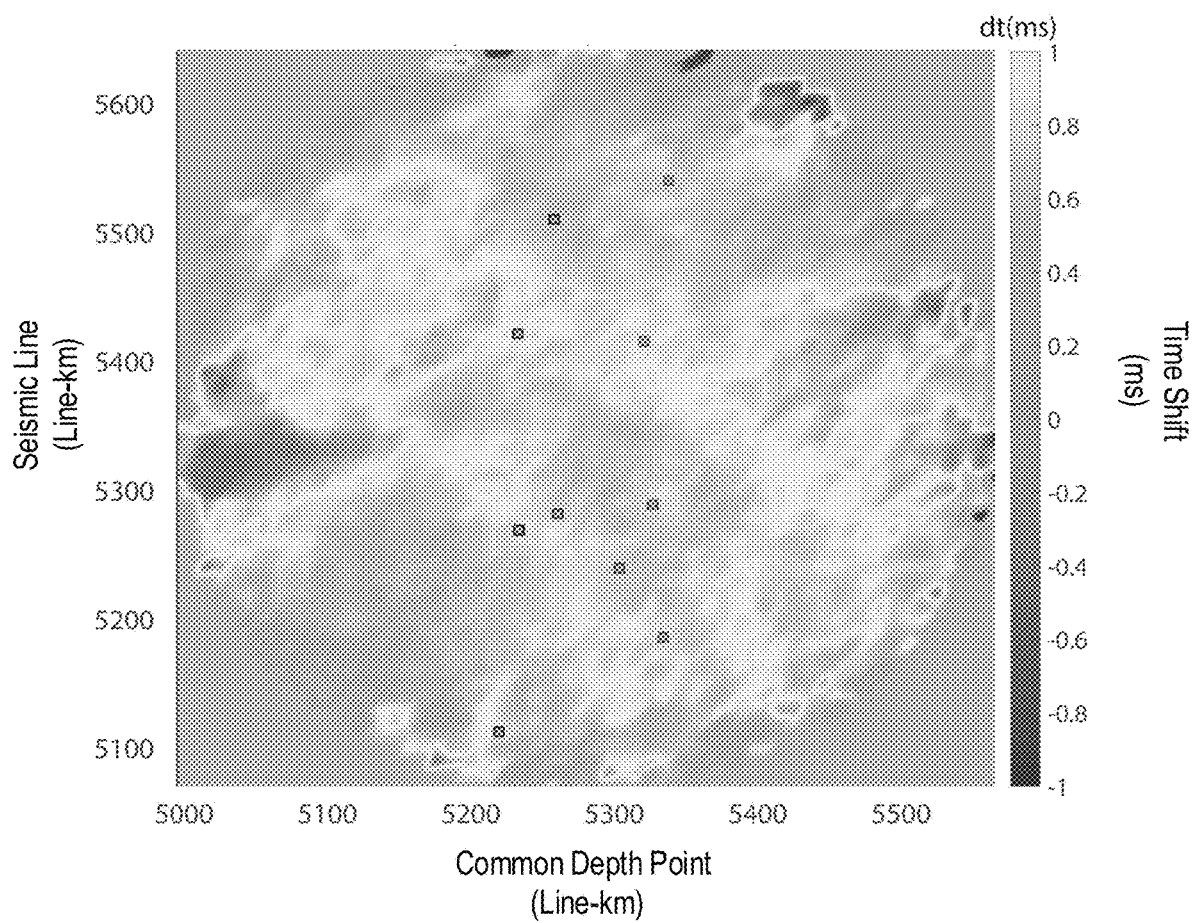
FIG. 5C shows a time shift image generated from calculating the difference between a cross CTP time shift scan and a before CTP time shift scan.

FIG. 5C shows a time shift image generated from calculating the difference between a cross CTP time shift scan and a before CTP time shift scan.

In some implementations, the four-dimensional seismic signal is used to estimate an amount of hydrocarbon fluid change in the reservoir between the baseline survey and the monitor survey. For example, the time shift values of the four-dimensional seismic signal can enable quantitative analysis of changes in the reservoir.

Figure 6:
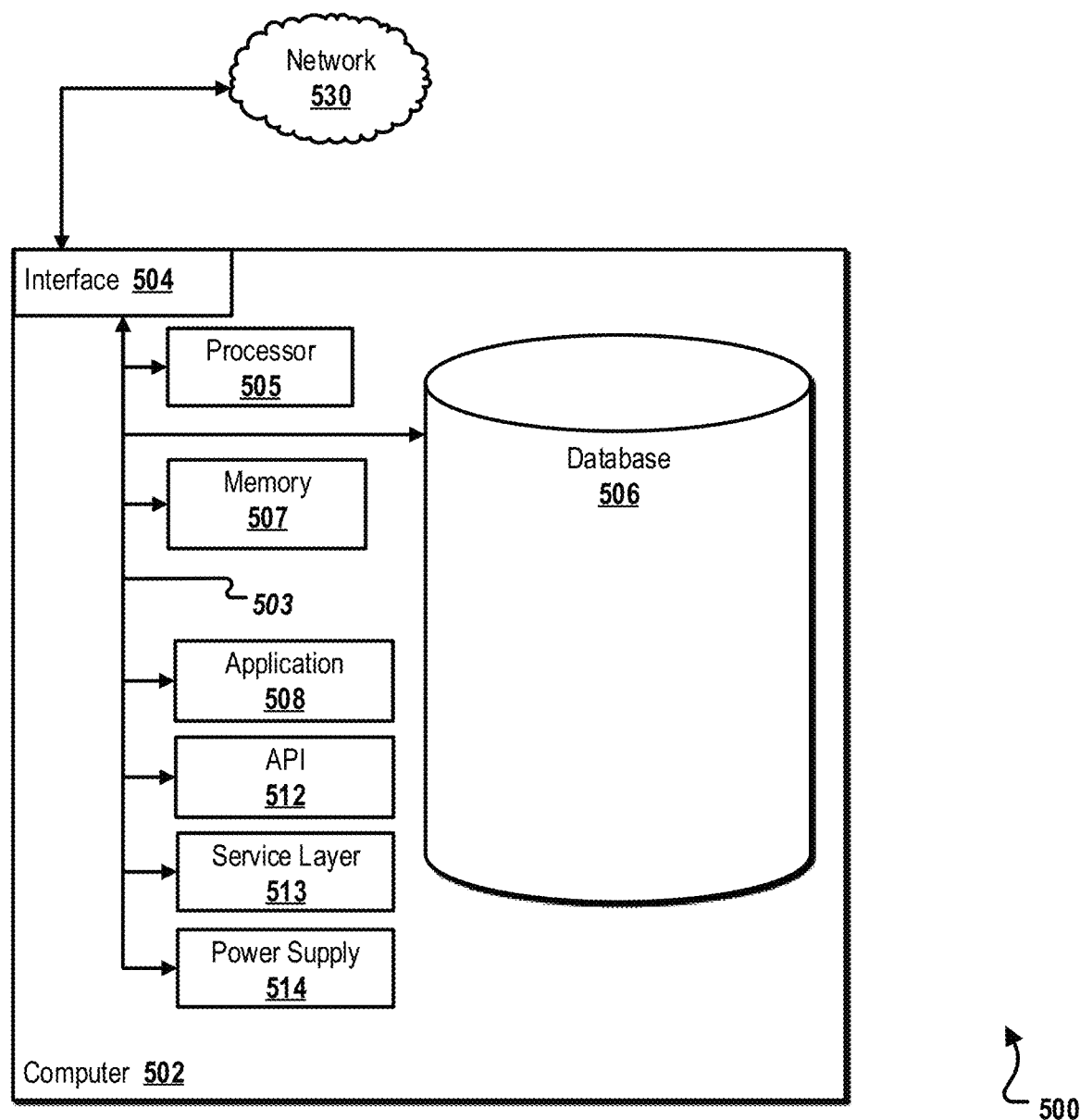
FIG. 6 is a block diagram of an example computer system used to provide computational functionalities associated with the algorithms, methods, functions, processes, flows, and procedures described in the present disclosure.

FIG. 6 is a block diagram of an example computer system 500 used to provide computational functionalities associated with the algorithms, methods, functions, processes, flows, and procedures described in the present disclosure (such as the method 100 described previously with reference to FIG. 1), according to some implementations of the present disclosure.

The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 6, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or can be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 6, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 6, two or more databases (of the same, different, or a combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 6, two or more memories 507 (of the same, different, or a combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices.

Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A computer-implemented method for monitoring a reservoir in an underground formation by generating a four dimensional seismic signal based on multiple sets of seismic data representing a subterranean formation, comprising:
    receiving a first common transmission point (CTP) gather and a second CTP gather of seismic data of seismic surveys of the subterranean formation, the first and second CTP gathers corresponding to at least one CTP, the first CTP gather comprising a first at least one plurality of before CTP traces and a first at least one plurality of cross CTP traces of the seismic data, and the second CTP gather comprising a second at least one plurality of before CTP traces and a second at least one plurality of cross CTP traces of the seismic data;
    for the first CTP gather, aggregating the first at least one plurality of before CTP traces to generate a first at least one aggregate before CTP trace and aggregating the first at least one plurality of cross CTP traces of the seismic data to generate a first at least one aggregate cross CTP trace;
    for the second CTP gather, aggregating the second at least one plurality of before CTP traces to generate a second at least one aggregate before CTP trace and aggregating the second at least one plurality of cross CTP traces of the seismic data to generate a second at least one aggregate cross CTP trace;
    wherein the first at least one aggregate before CTP trace, the first at least one aggregate cross CTP trace, the second at least one aggregate before CTP trace, and the second at least one aggregate cross CTP trace together represent the four dimensional seismic signal;
    determining a first time difference between the first at least one aggregate before CTP trace and the second at least one aggregate before CTP trace;

determining a second time difference between the first at least one aggregate cross CTP trace and the second at least one aggregate cross CTP trace;

determining, for monitoring the subterranean formation, a third time difference based on the first time difference and the second time difference; and estimating, based on the third time difference, a hydrocarbon fluid level of the subterranean formation.

2. The computer-implemented method of claim 1, wherein the first CTP gather corresponds to a baseline seismic survey conducted at a first time.

3. The computer-implemented method of claim 2, wherein the second CTP gather corresponds to a monitor seismic survey conducted at a second time, the second time occurring after the first time.

4. The computer-implemented method of claim 1, further comprising generating the first CTP gather from a first set of raw seismic data and generating the second CTP gather from a second set of raw seismic data.

5. The computer-implemented method of claim 4, wherein the second set of raw seismic data represents conditions in the underground formation between one and three years after the first set of raw seismic data was generated.

6. The computer-implemented method of claim 1, further comprising determining an amount of change of the hydrocarbon fluid level in the reservoir between a baseline survey and a monitor survey based at least partially on the third time difference.

7. A system, comprising:

a computer-readable memory comprising computer-executable instructions;

at least one processor configured to execute the computer-executable instructions, wherein when the at least one processor executes the computer-executable instructions the at least one processor is caused to perform operations to:

receive a first common transmission point (CTP) gather and a second CTP gather of seismic data of seismic surveys of the subterranean formation, the first and second CTP gathers corresponding to at least one CTP, the first CTP gather comprising a first at least one plurality of before CTP traces and a first at least one plurality of cross CTP traces of the seismic data, and the second CTP gather comprising a second at least one plurality of before CTP traces and a second at least one plurality of cross CTP traces of the seismic data;

for the first CTP gather, aggregate the first at least one plurality of before CTP traces to generate a first at least one aggregate before CTP trace and aggregate the first at least one plurality of cross CTP traces of the seismic data to generate a first at least one aggregate cross CTP trace;

for the second CTP gather, aggregate the second at least one plurality of before CTP traces to generate a second at least one aggregate before CTP trace and aggregate the second at least one plurality of cross CTP traces of the seismic data to generate a second at least one aggregate cross CTP trace;

wherein the first at least one aggregate before CTP trace, the first at least one aggregate cross CTP trace, the second at least one aggregate before CTP trace, and the second at least one aggregate cross CTP trace together represent a four dimensional seismic signal;

determine a first time difference between the first at least one aggregate before CTP trace and the second at least one aggregate before CTP trace;

determine a second time difference between the first at least one aggregate cross CTP trace and the second at least one aggregate cross CTP trace;

determine, for monitoring the subterranean formation, a third time difference based on the first time difference and the second time difference; and estimate, based on the third time difference, a hydrocarbon fluid level in a reservoir of a subterranean formation.

8. The system of claim 7, wherein the first CTP gather corresponds to a baseline seismic survey conducted at a first time.

9. The system of claim 8, wherein the second CTP gather corresponds to a monitor seismic survey conducted at a second time, the second time occurring after the first time.

10. The system of claim 7, wherein when the at least one processor executes the computer-executable instructions the at least one processor is further caused to perform operations to generate the first CTP gather from a first set of raw seismic data and generate the second CTP gather from a second set of raw seismic data.

11. The system of claim 10, wherein the second set of raw seismic data represents conditions in an underground formation between one and three years after the first set of raw seismic data was generated.

12. The system of claim 7, wherein when the at least one processor executes the computer-executable instructions the at least one processor is further caused to perform operations to determine an amount of change of the hydrocarbon fluid level in the reservoir between a baseline survey and a monitor survey based at least partially on the third time difference.

13. One or more non-transitory computer readable media storing instructions for monitoring a reservoir in an underground formation by generating a four dimensional seismic signal based on multiple sets of seismic data representing a subterranean formation, the instructions, when executed by at least one processor, configured to cause the at least one processor to perform operations comprising:

receiving a first common transmission point (CTP) gather and a second CTP gather of seismic data of seismic surveys of the subterranean formation, the first and second CTP gathers corresponding to at least one CTP, the first CTP gather comprising a first at least one plurality of before CTP traces and a first at least one plurality of cross CTP traces of the seismic data, and the second CTP gather comprising a second at least one plurality of before CTP traces and a second at least one plurality of cross CTP traces of the seismic data;

for the first CTP gather, aggregating the first at least one plurality of before CTP traces to generate a first at least one aggregate before CTP trace and aggregating the first at least one plurality of cross CTP traces of the seismic data to generate a first at least one aggregate cross CTP trace;

for the second CTP gather, aggregating the second at least one plurality of before CTP traces to generate a second at least one aggregate before CTP trace and aggregating the second at least one plurality of cross CTP traces of the seismic data to generate a second at least one aggregate cross CTP trace;

wherein the first at least one aggregate before CTP trace, the first at least one aggregate cross CTP trace, the second at least one aggregate before CTP trace, and the second at least one aggregate cross CTP trace together represent the four dimensional seismic signal;

determining a first time difference between the first at least one aggregate before CTP trace and the second at least one aggregate before CTP trace;

determining a second time difference between the first at least one aggregate cross CTP trace and the second at least one aggregate cross CTP trace;

determining, for monitoring the subterranean formation, a third time difference based on the first time difference and the second time difference; and estimating, based on the third time difference, a hydrocarbon fluid level of the subterranean formation.

14. The one or more non-transitory computer readable media of claim 13, wherein the first CTP gather corresponds to a baseline seismic survey conducted at a first time.

15. The one or more non-transitory computer readable media of claim 14, wherein the second CTP gather corresponds to a monitor seismic survey conducted at a second time, the second time occurring after the first time.

16. The one or more non-transitory computer readable media of claim 13, further comprising generating the first CTP gather from a first set of raw seismic data and generating the second CTP gather from a second set of raw seismic data.

17. The one or more non-transitory computer readable media of claim 16, wherein the second set of raw seismic data represents conditions in the underground formation between one and three years after the first set of raw seismic data was generated.

18. The one or more non-transitory computer readable media of claim 13, further comprising determining an amount of change of the hydrocarbon fluid level in the reservoir between a baseline survey and a monitor survey based at least partially on the third time difference.

\* \* \* \* \*